Dec. 14, 1965 A. BRENNER Re. 25,945

ZIPPER FOOT DEVICE

Original Filed Jan. 17, 1964

INVENTOR.
Abe Brenner
BY Jerome Bauer
ATTORNEY

United States Patent Office

Re. 25,945
Reissued Dec. 14, 1965

25,945
ZIPPER FOOT DEVICE

Abe Brenner, 255 W. 23rd St., New York, N.Y.

Original No. 3,140,680, dated July 14, 1964, Ser. No. 338,413, Jan. 17, 1964. Application for reissue May 20, 1965, Ser. No. 463,980
8 Claims. (Cl. 112—151)

Figure 1:
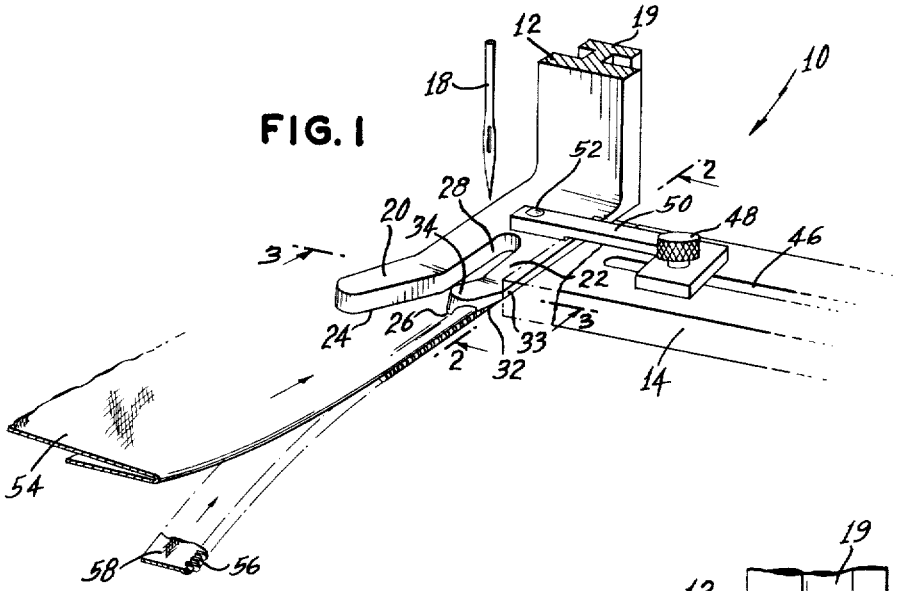

Matter enclosed in heavy brackets [ ] appears in the original patent but forms no part of this reissue specification; matter printed in italics indicates the additions made by reissue.

This invention relates to a sewing machine presser foot and, in particular, to a zipper foot for use in sewing a zipper and material together.

Despite the apparent ease with which a seam is sewn to connect a zipper to a strip of material, the better seamstresses and the more exclusive, and better garment manufacturers have always recognized that the sewing of a zipper to material has been a real and time consuming problem if the sewing is to be done accurately and properly. To understand the problem better, the uninitiated must realize that a zipper serves to close a separation in a garment. Therefore, when the zipper is sewn into the garment, the separation which the zipper is to close must assume the appearance of a closed seam which is usually the continuation of an adjacent seam. If too much material overlaps its respective row of gripper elements of its side of the zipper, or if the seam or stitching connecting the zipper to the material is uneven, when the zipper is closed the overlapping material puckers and creates an unsightly appearance. On the other hand, should there be too little overlap of the material over the zipper elements, the beauty of the garment is lessened by the exposure of the zipper.

There have been attempts in the past to remedy the problem of sewing zippers correctly to garments and other material. An example of this is found in the well known single zipper foot. The single zipper foot is merely a halving of a standard sewing machine presser foot. The half of the presser foot that remains is narrowed in width to fit between the sewing needle and the zipper to press downward against the material to be sewn to the zipper. This prior attempt, the only real attempt to solve the problem, constitutes no solution at all. This half zipper foot performs no guiding function. It exerts no control over the zipper or its row of gripper elements, nor does it limit or guide the material in its movement beneath the sewing machine needle during the sewing operation.

The prior art has failed to recognize the need to enable the adjustment and the control of the amount of material that will overlap the zipper gripper elements to which it is to be sewn; the need to hold the material and the zipper in their adjusted relationship; the necessity of causing them to move along a controlled pathway to the point where they are sewn or seamed together by the sewing needle, and the necessity of assuring that the material and the zipper will not shift position with respect to each other during their movement along their sewing pathway.

Accordingly, it is an object of this invention to overcome the aforementioned problems of the prior art by providing a zipper foot device that does recognize the stated problems and solves them by a simple and inexpensive zipper foot construction. A construction that does not require complex mechanisms, that does not require mechanical skills for its operation, and that can be used by inexperienced sewing machine operators to accurately and consistently sew a zipper to any material or garment without the necessity of tearing open the seam and redoing the same to insure the accuracy of the zipper stitching.

In carrying out the objects of the invention, a feature and object thereof resides in the ability to adjustably control the amount of material that will overlap the zipper elements and to enable the same to be sewn straight and accurately to the zipper throughout a given length thereof.

Figure 2:
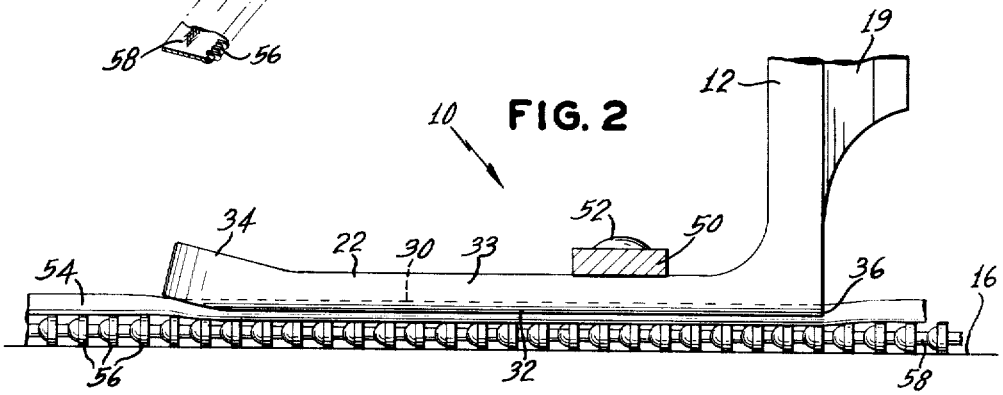
Figure 3:
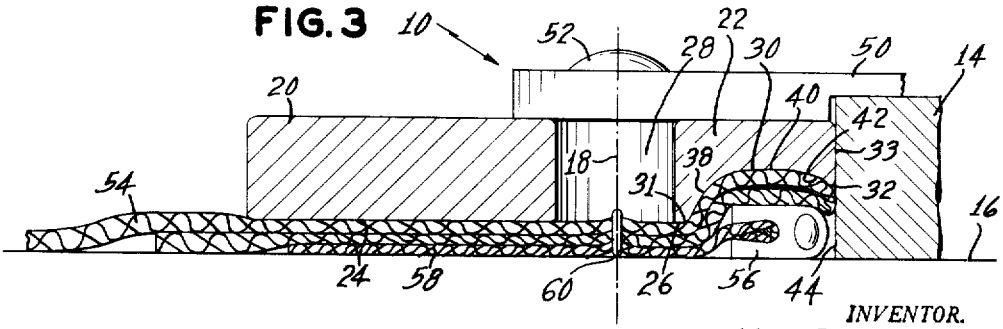

Other and further objects of this invention reside in the structures and arrangements hereinafter more fully described with reference to the accompanying drawing in which:

FIG. 1 is a perspective view of the sewing machine presser foot and slidable member constructed according to the teaching of the invention, FIG. 2 is a cross-section of FIG. 1 taken along lines 2—2, and FIG. 3 is a cross-section of FIG. 1 taken along lines 3—3.

Referring now to the figures of the drawing, the zipper foot device or structure there shown is generally identified by the numeral 10. The zipper foot device 10 comprises a zipper foot member 12 and a slidably movable block or material limiting member 14 that is adapted to rest on the bed or top surface 16 of a sewing machine (not shown). The specific details of the sewing machine other than the sewing needle 18 illustrated in FIG. 1 and depicted by the dash-dot lines in FIG. 3 are not fully disclosed because the same form no part of the present invention. The illustration of the sewing needle 18 is made to enable a clearer understanding of the instant invention.

The zipper foot member 12 is provided with an upstanding body 19 that is usually adapted to be inserted into and as a part of the sewing machine and to be secured in place thereto. The foot member 12 is reciprocated by the seamstress to engage the material therebeneath prior to the sewing operation of the needle 18. The zipper foot member 12 has two substantially horizontally disposed elongated legs or feet 20 and 22. In practice, the leg 20 is slightly longer in length than that of the leg 22. However, each of the legs 20 and 22 has a respective flat underside 24 and 26 that is adapted to rest on the material or fabric to be sewn by the needle 18. The legs 20 and 22 have a separation 28 defined between them to accommodate the reciprocating sewing needle 18.

The horizontal leg 22 is provided with a guide pathway or groove 30 at the lower corner thereof remote from the separation 28. The pathway or groove 30 projects upward into the leg 22 and has an edge 31 positioned at the underside or base 26 thereof. The guide pathway or groove 30 extends for the full length of the leg 22. A second or upper edge 32 is positioned on the side 33 which is located most remote from the separation 28 and spaced above the underside 26. The upper edge 32 also extends for the full length of the leg 22. The pathway or groove 30, defined at its bottom and side by the lower edge 31 and the upper edge 32 respectively, has an entrance that is located at the raised forward end 34 of the leg 22. The groove 30 exits at 36 at the rear of the leg 22. The surface of the guide pathway or groove 30 is defined by an upwardly curved portion 38 extending from the lower edge 31 upward into the leg 22 and merging with a substantially flat curved portion 40. The flat curved portion 40 merges with and terminates in a downwardly curved lip 42 that ends at the upper edge 32 on the side 33 of the leg 22.

Positioned along the side 33 of the leg 22 is the slidable limiting member 14 as seen in FIGS. 1 and 3. The member 14 is provided with a vertically disposed flat limiting guide surface 44 that is adapted to abut the surface 33 or to be adjustably spaced therefrom. In the illustration in FIGS. 1 and 2, the surface 44 is shown in abutting relationship with the adjacent side surface 33. However, in practice, the member 14 may be slidably moved with respect to the surface 33 and the edge 32 defined thereon to vary the sidewise extent of the pathway or groove 30 to define an extension and an adjustable side thereof.

To permit this relative movement, the member 44 is provided with an elongated slot 46 in which a threaded thumb screw 48 is rotatable. The thumb screw 48 passes downward through a suitable opening defined in a mounting plate 50 that is secured at 52 to the zipper foot member 12. The thumb screw 48 is adapted to be threadingly engaged in a suitable threaded opening (not shown) aligned therewith in the bed 16 of the sewing machine. Thus, by loosening the thumb screw 48, the member 14 may be releasably secured to be moved relative to the adjacent side 33 of the leg 22 from the abutting position as shown in FIGS. 1 and 3 to a position spaced therefrom as permitted by the length of the slot 46. When once the member 14 is adjusted into its desired position, the simple threading of the thumb screw 48 downward into the mating opening in the bed 16 of the sewing machine will lock the member 14 in its position of adjustment.

In operation, a length of fabric material 54 is generally folded over upon itself as shown in FIG. 1 to overlay a respective row of aligned gripper elements 56 of one side of a zipper 58. The seamstress selects the proper amount of overlap of the material 54 that is desired to smoothly cover the row of zipper gripper elements 56. The material 54 and the zipper 58 are then positioned beneath the zipper foot 12 so that the gripper elements 56 are located directly beneath the pathway 30 with the material 54 positioned between the surface of the pathway 30 and the gripper elements 56 therebelow. The pathway 30 is so defined as to conform substantially to the shape of the gripper elements 56 when the material 54 is positioned thereover. This is shown more clearly in FIG. 3 wherein it is noted that the shape of the groove conforms substantially to that of the material 54 and the gripper elements 56 after the same is pressed tightly against the zipper gripper elements therebelow by the pressure of the zipper foot 12 thereon.

The limiting member 14 is then adjusted relative to the side 33 to permit just the right or desired amount of the material 54 to extend beyond the lip 42 and the lower edge 32 thereof. Thus, the relative position or spacing of the member 14 with respect to the side 33 controls the amount of material 54 that will overlap the zipper elements 56 as the same are guided to the sewing needle 18 that sews the same together as indicated by the stitches 60 in FIG. 3.

During the sewing operation, the lip 42 presses the material 54 down tightly against the rounded corners of the gripper elements 56 therebeneath. The edge 32, however, permits the material to extend in overlapping relationship with the gripper elements beyond the side 33. The location of the surface 44 on the limiting member 14 with respect to the side 33 limits the amount of material that will extend beyond the lip 42 and its edge 32, thereby controlling the amount of overlap of material. Naturally, if the material 54 is heavy, the space between the surfaces 44 and 33 will be greater than if the material is light as shown in FIG. 3.

The substantially flat curved surface portion 40 conforms substantially to the shape of the material 54 positioned over the gripper elements 56, and presses the same downwardly thereagainst as illustrated in FIG. 3. The conforming upwardly curved portion 38 and the lower edge 31 hold the material 54 tightly against the adjacent sharp edges of the gripper elements 56 while the underside 26 of the leg 22 and the second leg 20 provide sufficient force on the material and the fabric of the zipper 58 to hold the same in their relative relationship as shown. To facilitate the convenient entry of the material and gripper elements into the groove or pathway 30, the entrance thereof is provided at the raised forward end 34 of the leg 22 and the material 54 is gradually pressed down snugly into engagement with the gripper elements 56 as they enter the groove as shown in FIG. 2.

Thus, the present invention constitutes a simple yet extremely efficient zipper foot device. It retains the twoleg 20, 22 concept of a standard presser foot thereby taking advantage of the largest possible area of presser foot engagement with the material and the zipper to hold the same together as they are being sewn. The contour and arrangement of the pathway 30 defined in the one leg 22 conforms to that of the material and the gripper elements therebeneath to assure that they will remain in [sung] *snug* engagement with each other. This manner of engagement prevents their relative movement from the time they enter beneath the presser foot 22 and are sewn by the needle 18 and thereafter exit therefrom at the rear end 36. The adjustment of the member 14 relative to the edge 32 and side 33 permits the overlap of material and gripper elements to be varied. When once varied, this overlap is continuously retained by the movement of the material and gripper elements along the pathway 30.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a zipper foot device for sewing a zipper and material together, the combination comprising a [pair of] substantially horizontal [legs] *leg* having [a separation] *an opening* defined [therebetween] *therein* to accommodate a reciprocating sewing needle therein, one *side* of said horizontal [legs] *leg* having a groove of uniform shape defined therein extending the length of said [one leg] *side* along the lower corner which is remote from said [separation] *opening*, said groove having a lower edge along the bottom of said one *side of said* horizontal leg in the same horizontal plane as the bottom of the [other of the pair of] horizontal [legs] *leg* and an upper edge along that side of said one horizontal leg which is most remote from said [separation] *opening*, the defining surface of said groove curving upwardly from said lower edge and extending into a curved portion which terminates at said upper edge, the surface of said groove forming a guide to press material against gripper elements of a zipper to be sewn thereto as the material and gripper elements are moved beneath the sewing needle during the operation of the sewing machine, limiting means on the side of said one horizontal leg adjacent said upper edge for movement relative to said groove, and means to releasably secure said limiting means to said zipper foot and relative to said groove.

2. In a zipper foot device for sewing a row of gripper elements of a zipper to material in a sewing machine, the combination comprising a [pair of] substantially horizontal [legs spaced from] *leg receiving* a reciprocating sewing needle *therein*, an elongated groove of uniform shape defined in [one of] said horizontal leg along the lower corner thereof which is remote from said reciprocating needle, said groove having a lower edge and an upper edge, said lower edge being on the underside of said [one] horizontal leg in the same horizontal plane as the bottom of the [other of the pair of] horizontal [legs] *leg* and said upper edge being on [the] *one* side of said [one] horizontal leg which is remote from said reciprocating needle, said groove being defined by a wall curving upwardly from said lower edge and terminating in a downwardly depending lip located at said upper edge, the surface of said wall defining said groove pressing the material to be sewn against the row of gripper elements of a zipper to be sewn thereto, said downwardly depending lip engaging an edge of the material to be sewn to restrict the movement of said material to a predetermined distance beyond the row of zipper gripper elements, said defining wall of said groove guiding the material and the row of zipper [gipper] *gripper* elements along the full length of the groove as the material and zipper [gipper] *gripper* elements are moved beneath the sewing needle during the operation of said sewing machine, limiting means engaging the side of said [one] horizontal leg adjacent said upper edge for movement relative thereto, and means to releasably engage said limiting means with said side of said [one] horizontal leg and for movement relative to said upper edge.

3. In a zipper foot device for a sewing machine, the combination comprising a pair of substantially horizontal legs relatively spaced from each other to define a separation therebetween for the accommodation of a reciprocating sewing needle therein, one of said horizontal legs having a groove of uniform shape defined therein along the lower corner thereof which is remote from said separation and extending for the full length thereof, one edge of said groove being on the underside of said one horizontal leg in the same horizontal plane as the underside of the other of the pair of horizontal legs, another edge of said groove being on a side of said one horizontal leg which is farthest from said separation, the surface of said groove extending from said lower edge, being curved upward, and terminating in a downwardly directed lip at said other edge and extending for the full length of said one horizontal leg, said groove surface forming a guide along the length of said one horizontal leg to press material to a row of gripper elements of a zipper to be sewn thereto, said downwardly depending lip engaging an edge of the material to be sewn to restrict the movement of the material to a predetermined position relative to said row of zipper gripper elements, said groove having an entrance and an exit at opposite ends thereof so that as the material and gripper elements are moved beneath the zipper foot to be sewn by a sewing needle movable in said separation, said portions of said groove surface engagingly guide the movement of the material and the zipper gripper elements along the full length of the groove from the entrance to the exit thereof, means on said farthest side of said one horizontal leg for movement relative thereto, and means to releasably engage said last named means with said farthest side of said one horizontal leg.

4. A zipper foot device for use in a sewing machine for sewing a zipper to material, the combination comprising a [pair of] substantially horizontal [legs] *leg* positioned adjacent to and on opposite sides of a reciprocating sewing needle, a groove of uniform shape on the underside [of one] of said horizontal [legs] *leg* extending the length thereof, said groove having an entrance and an exit at opposite ends thereof, said groove having a lower edge in the same horizontal plane as the bottom of the [other of the pair] horizontal [legs] *leg* and an edge remote from said reciprocating sewing needle, the defining surface of said groove curving upwardly from said lower edge and merging with a substantially flat curved portion which merges with a downwardly curved portion terminating at said edge remote from said reciprocating sewing needle, said surface of said groove forming a guide for the material to be sewn to press the same tightly against a row of gripper elements of a zipper to be sewn thereto so that as the material and zipper are moved by the sewing machine beneath the zipper foot during the sewing operation, the groove surface guides the movement of the material and the zipper in fixed relationship along the full length of the groove from the entrance to the exit thereof, means movable relative to said [one] horizontal leg on the side adjacent said remote edge thereof, and means to connect said movable means with said [one] horizontal leg in a position of adjustment relative to said remote edge.

5. A zipper foot device for use in a sewing machine for sewing a zipper and material together, the combination comprising a pair of substantially horizontal legs positioned adjacent to and on opposite sides of a reciprocating sewing needle, a groove of uniform shape on the underside of one of said horizontal legs extending the length thereof, said groove having an entrance and an exit at opposite ends thereof, said groove having two edges on the underside of said horizontal leg, one of said edges being in the same horizontal plane as the underside of the other of the pair of horizontal legs, the defining surface of said groove curving upwardly from both of said edges, said surface of said groove serving to press material to be sewn against a row of gripper elements of a zipper to be sewn thereto so that as the material and zipper gripper elements are moved by the sewing machine beneath the zipper foot during the sewing operation the groove surface guides the movement of the material and the zipper gripper elements along the full length of the groove from the entrance to the exit thereof, movable means adjacent one of said edges of said groove, and means to releasably engage said movable means with said zipper foot in a position relative to said one of said edges to vary the spacing of said movable means therefrom.

6. A zipper foot device for a sewing machine comprising the combination of a substantially horizontal leg positioned adjacent to and on opposite sides of a reciprocating sewing needle, a groove of uniform shape on the underside of one *side* of said horizontal [legs]*leg* extending the length thereof, said groove having an entrance and an exit at opposite ends thereof, said groove having an edge near said reciprocating sewing needle in the same horizontal plane as the underside of the [other of the pair of] horizontal [legs]*leg* and an edge remote from said reciprocating sewing needle, the surface of said groove curving upwardly from said edge near said reciprocating sewing needle and extending into a substantially flat curved portion merging into a downwardly depending portion terminating at said edge remote from said reciprocating sewing needle, the surface of said groove forming a guide for the material to be sewn to press the same tightly against a row of gripper elements of a zipper to be sewn thereto, so that as the material and gripper elements are moved during the operation of the sewing machine the groove surface guides the material and zipper gripper elements, limiting means movable adjacent to and engageable with said remote edge, and means to engage said limiting means with and in a position of adjustment relative to said remote edge.

7. In a zipper foot for a sewing machine for sewing material to a zipper having a row of zipper elements, a pair of substantially horizontal legs joined together at the rear thereof and defining a separation at the front thereof to accommodate a reciprocating sewing needle therebetween, one of said horizontal legs having a groove of uniform shape defined therein extending for the full length thereof along the lower corner remote from said separation defined by said horizontal legs, a lower edge of said groove being spaced from said separation defined by said horizontal legs and being on the underside of its respective horizontal leg in the same horizontal plane as the underside of the other of the pair of horizontal legs, an upper edge of said groove being spaced from said separation and being on the side of its respective horizontal leg which is farthest from said separation, the surface of said groove from said lower edge being an upwardly curved portion extending into a substantially flat curved portion which terminates in a downwardly curved lip at said upper edge, said upwardly curved portion forming a guide for the material to be sewn to press the same tightly against the corner of a row of gripper elements of a zipper to be sewn thereto, said substantially flat curved portion forming a guide to press the material tightly against the row of gripper elements, said downwardly curved lip retaining the material in engagement with a correspondingly curved portion of the gripper elements of the zipper, said groove having an entrance and an exit at opposite ends thereof so that as the material and gripper elements to be sewn by the sewing needle are moved by the sewing machine beneath the zipper foot and in said groove at said entrance and therebeyond from said exit, said portions of said groove surface guide the movement of the material and the zipper gripper elements along the full length of said groove and all of said portions of said groove engaging the material positioned therebeneath to press the same against the row of zipper gripper elements therebeneath during the sewing operation of the sewing needle.

8. The combination of a zipper foot as in claim 7, and a slidable member positioned in adjustable relation to said zipper foot, said slidable member having a flat side adjacent to said zipper foot, said slidable member having a slot therethrough to accommodate a screw member which passes through said slot to enter a threaded hole in said sewing machine, means to connect said slidable member with said zipper foot, and a screw member in said slot and engageable with a threaded hole in the sewing machine to releasably secure said slidable member in its position of adjustment.

References Cited by the Examiner

The following references, cited by the Examiner, are of record in the patented file of this patent or the original patent.

UNITED STATES PATENTS

| | | | |
|---|---|---|---|
| 1,596,789 | 8/1926 | Azara | 112—151 |
| 2,339,179 | 1/1944 | Loeb | 112—139 |
| 2,711,704 | 6/1955 | Maczuga et al. | 112—153 |
| 2,807,225 | 9/1957 | Pisano | 112—235 |

FOREIGN PATENTS

| | | |
|---|---|---|
| 513,026 | 10/1939 | Great Britain. |

FRANK J. COHEN, *Primary Examiner.*